United States Patent [19]

Tanaka

[11] Patent Number: 5,462,820

[45] Date of Patent: Oct. 31, 1995

[54] NON-AQUEOUS BATTERY WITH A BLOCK COPOLYMER SEALING MEMBER

[75] Inventor: Mitsutoshi Tanaka, Minami-ashigara, Japan

[73] Assignee: Fuji Photo Film Co., Ltd., Kanagawa, Japan

[21] Appl. No.: 333,301

[22] Filed: Nov. 1, 1994

[30] Foreign Application Priority Data

Nov. 2, 1993 [JP] Japan .................................. 5-274638

[51] Int. Cl.6 .................................................. H01M 2/08
[52] U.S. Cl. .......................... 429/174; 429/185; 429/197; 429/218; 429/249
[58] Field of Search ........................ 429/174, 181, 429/184, 185, 194, 197, 249, 218, 254, 196, 94

[56] References Cited

U.S. PATENT DOCUMENTS

| | | | |
|---|---|---|---|
| 4,144,384 | 3/1979 | Jacobson et al. | 429/218 |
| 4,166,160 | 8/1979 | Chianelli et al. | 429/218 |
| 4,198,476 | 4/1980 | Di Salvo, Jr. | 429/194 |
| 4,340,652 | 7/1982 | Raistrick et al. | 429/112 |
| 4,618,547 | 10/1986 | Markin | 429/174 |
| 5,332,633 | 7/1994 | Adamson et al. | 429/174 |
| 5,360,685 | 1/1994 | Tanaka | 429/185 |

*Primary Examiner*—Anthony Skapars
*Attorney, Agent, or Firm*—Sughrue, Mion, Zinn, Macpeak & Seas

[57] ABSTRACT

A non-aqueous battery comprises a positive electrode, a negative electrode and a non-aqueous electrolyte as well as a battery can serving as a negative electrode-terminal and a sealing terminal serving as a positive electrode-terminal which are crimp-sealed through a gasket comprising a polyolefin resin, wherein the polyolefin resin comprises a block copolymer of propylene and ethylene having an ethylene copolymerization rate ranging from 2 to 20% by weight and a modulus in flexure ranging from 12000 to 18000 kg/cm$^2$. The non-aqueous battery has substantially improved storage stability when it is not in use and is not deteriorated even when it is subjected to discharge, large current discharge and pulse-discharge in an atmosphere whose temperature varies.

20 Claims, 1 Drawing Sheet

NON-AQUEOUS BATTERY WITH A BLOCK COPOLYMER SEALING MEMBER

BACKGROUND OF THE INVENTION

The present invention relates to a non-aqueous battery and, in particular, to a non-aqueous second battery whose negative electrode comprises a substance capable of absorbing and releasing lithium ions.

Polypropylene has been used as gasket for the non-aqueous battery. This is because polypropylene does not dissolve or swell in organic solvents used in the non-aqueous battery. However, the non-aqueous battery should have more improved high reliability and accordingly, there have conventionally been developed a variety of techniques such as those listed below. For instance, Japanese Un-examined Patent Publication (hereunder referred to as "J. P. KOKAI") No. Sho 60-35452 discloses that the sealing performance at the sealed portion of the non-aqueous battery can be improved by increasing residual stress at that portion through the use of a polypropylene material having a Rockwell hardness of not less than 95. In addition, J. P. KOKAI Nos. Sho 61-51752 and Sho 63-166140 disclose that the sealing performance can be improved through the use of a crosslinked polypropylene and a highly crystalline polypropylene material, respectively and J. P. KOKAI No. Hei 2-142057 discloses that the sealing performance can be improved through the use of a polypropylene material having a modulus in flexure ranging from 18000 to 30000 kg/cm$^2$.

Among the foregoing non-aqueous batteries, the non-aqueous second batteries whose negative electrode comprises a substance capable of absorbing and releasing lithium ions are greatly influenced by the external invasive moisture into the batteries and, in particular, the performance thereof is greatly deteriorated. Therefore, the gasket used therein should satisfy more strict requirement for sealing performance. When a polypropylene material having a modulus in flexure of 25000 kg/cm$^2$ is, for instance, selected as a material for the gasket to increase the stress at the sealing portion, the sealing performance is surely improved and accordingly, the shelf stability thereof is improved. However, the marked improvement in the shelf stability is ensured only when the battery is allowed to stand while it is not in use, but the shelf stability thereof is not always improved when the battery is in use and, in particular, when the battery is, for instance, charged, discharged at a high current or pulse-discharged and used in an atmosphere whose temperature is changed, the degree of deterioration of the battery is rather low when a polypropylene material having a low modulus in flexure is used (this tendency is conspicuous in particular when the negative electrode comprises a lithium-containing transition metal oxide). More specifically, in the conventional techniques, the reduction of the deterioration during using a battery is contrary to the improvement in the shelf stability during storing the battery.

SUMMARY OF THE INVENTION

Accordingly, an object of the present invention is in general to solve the foregoing problems associated with the conventional techniques and more specifically to provide a non-aqueous battery which has improved shelf stability during storage and whose deterioration is low even during use (for instance, the battery is charged, discharged at a high current or pulse-discharged in an atmosphere whose temperature varies).

The inventors of this invention have conducted various studies to solve the foregoing problems of the conventional techniques, have surprisingly found that the use of a specific propylene-ethylene block copolymer as a material for the gasket permits not only the improvement in the shelf stability during storage while it is not in use, but also the reduction of the degree of deterioration during use (during charging, discharging at a high current or pulse-discharging in an atmosphere whose temperature varies).

The foregoing object of the present invention can effectively be accomplished by providing a non-aqueous battery which comprises a positive electrode, a negative electrode and a non-aqueous electrolyte as well as a battery can serving as a negative electrode-terminal and a sealing terminal serving as a positive electrode-terminal which are crimp-sealed through a gasket comprising a polyolefin resin, wherein the polyolefin resin comprises a block copolymer of propylene and ethylene having an ethylene copolymerization rate ranging from 2 to 20% by weight and a modulus in flexure ranging from 12000 to 18000 kg/cm$^2$.

According to a preferred embodiment of the present invention, there is provided a non-aqueous second battery wherein the negative electrode comprises a substance capable of absorbing and releasing lithium ions.

DESCRIPTION OF THE PREFERRED EMBODIMENTS

Figure 1:
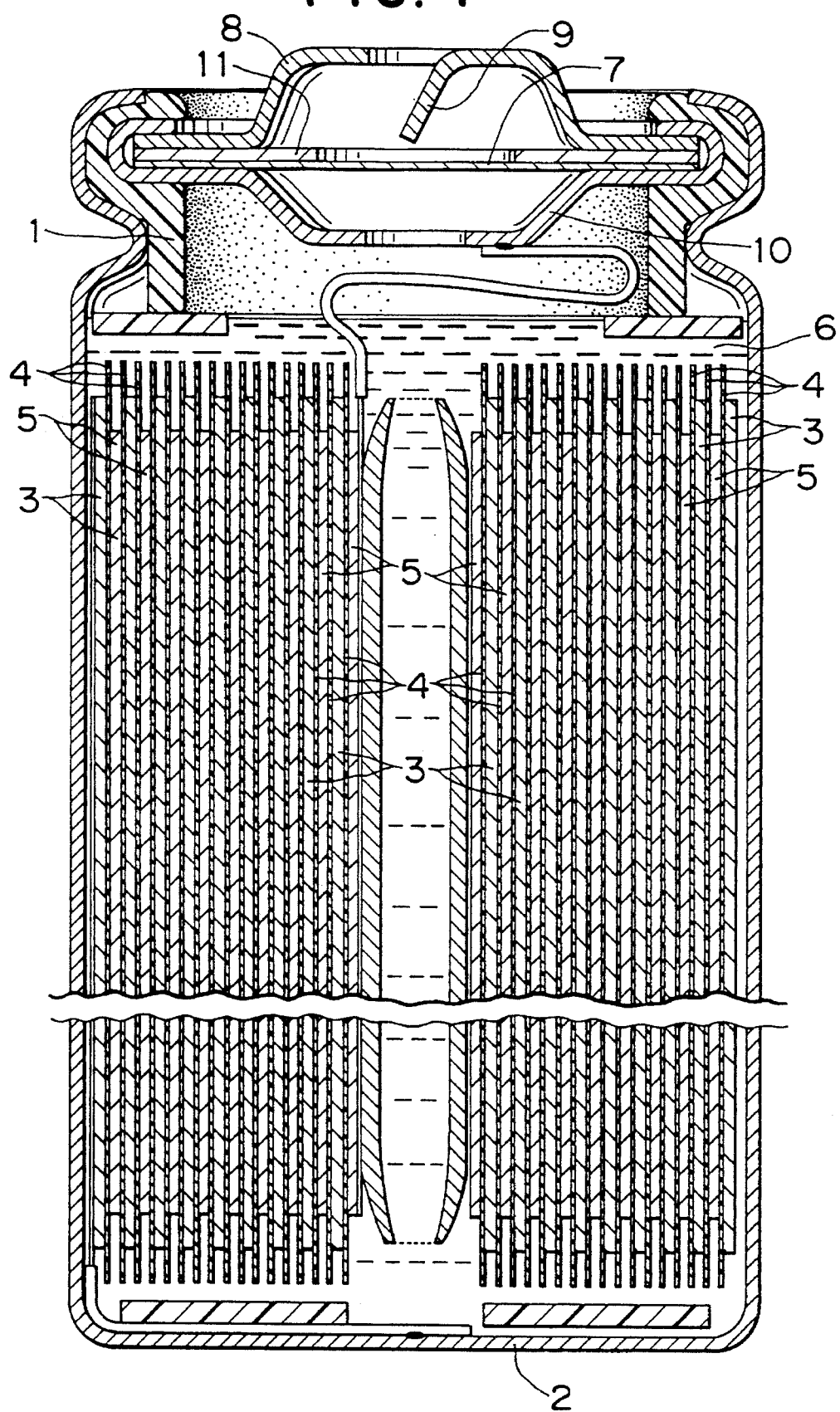
FIG. 1 is a schematic vertical sectional view of an embodiment of the battery of the present invention, a part of which is omitted. 1: a gasket, 2: a battery can serving as a negative electrode-terminal, 3: a negative electrode, 4: a separator, 5: a positive electrode, 6: an electrolyte, 7: a flexible sheet valve, 8: a sealing terminal cap serving as a positive electrode-terminal, 9: a cutting blade, 10: a sealing sheet, 11: a ring

The present invention will hereunder be described in more detail.

The block propylene-ethylene copolymer as a material for gaskets used in the present invention has an ethylene copolymerization rate (the rate (% by weight) of ethylene based on the total weight of ethylene and propylene which are charged for preparing the polymer) preferably ranging from 2 to 20% by weight, more preferably 3 to 15% by weight and most preferably 4 to 10% by weight. Moreover, the copolymer preferably has a modulus in flexure (as determined according to ASTM D-790) preferably ranges from 12000 to 18000 kg/cm$^2$, more preferably 13000 to 17000 kg/cm$^2$ and most preferably 14000 to 16000 kg/cm$^2$.

Specific examples of materials for the gasket include BJS-809, BJS-9 (M), BJH-9 (M), BJHH-2800, BJHH-9 (M), BJ3H-M, BJ4H-M and BJ5H-M (these products are all available from Mitsui Toatsu Chemicals, Inc.); BC2E, BC4, BC3B and BC6C (these products are all available from Mitsubishi Petrochemical Co., Ltd.); 8300J, 8700J, 8826J and 8506J (these products are all available from Mitsubishi Chemical Industries Ltd.); and K5420R(available from Chisso Corporation), with BJH, BJHH, B3H, BJ4H, BJ5H, BC3B, BC6C, 8506J and K5420R being more preferred.

The gasket used in the present invention may, if necessary, comprise an antistatic agent, an agent for imparting weatherability, a nucleating agent for crystallization, a lubricant, an inorganic filler, talc, an elastomer, an antioxidant, a plasticizer, a surfactant, a water repellant and/or carbon in an appropriate amount, in addition to the polymer.

The positive electrode-active materials usable in the present invention may be any electrode material for non-aqueous batteries. The active material may be inorganic compounds serving as positive electrode-active materials such as cobalt oxides (see, for instance, J. P. KOKAI No. Sho 52-12424, DE-2606915), Li-Co oxides (see, for instance, U.S. Pat. No. 3,945,848 and U.S. Pat. No. (4,340, 652), Li-Ni-Co oxides (see, for instance, EP-243926A, J. P. KOKAI Nos. Sho 63-114063, Sho 63-211565, Sho 63-299056 and Hei 1-120765), vanadium oxides (see, for instance, FR-21611796, J. P. KOKAI Nos. Sho 55-53077, Sho 62-140362 and Sho 62-227358), Li-V oxides (see, for instance, DENKI KAGAKU (Electrochemistry), 1980, 48, p. 432; Journal of Electrochemical Society, 1983, 130, p. 1225; and J. P. KOKAI No. Hei 2-12769), manganese oxides (see, for instance, EP-269855 and J. P. KOKAI No. Sho 63-58761), Li-Mn oxides (see, for instance, J. P. KOKAI Nos. Sho 56-136464, Sho 56-114064, Sho 56-114065, Sho 56-148550, Sho 56-221559, Hei 1-5459, Hei 1-109662, Hei 1-128371, Hei 1-209663 and Hei 2-27660) and Li-Ni-Mn oxides (see, for instance, J. P. KOKAI No. 63-210028).

The positive electrode-active materials may be organic polymers serving as positive electrode-active materials, such as polyaniline derivatives (see, for instance, Molecular Crystal and Liquid Crystal, 1985, 121, p. 173 and J. P. KOKAI Nos. Sho 60-197728, Sho 63-46223, Sho 63-243131, Hei 2-219823), pyrrole derivatives (see, for instance, Journal of Chemical Society Chemical Communication, 1979, p. 854, DE-3223544A3A, DE-307954A and J. P. KOKAI Nos. Sho 62-225517, Sho 63-69824 and Hei 1-170615), polythiophene derivatives (see, for instance, J. P. KOKAI Nos. Sho 58-187432 and Hei 1-12775), polyacene derivatives (see, for instance, J. P. KOKAI No. Sho 58-209864) and poly(p-phenylene) derivatives. In this respect, each derivative includes copolymers. These organic polymers are detailed in "DODENSEI KOBUNSHI (Conductive Polymer)", edited by Naoya OGATA, Published by Kodansha Scientific Company (1990).

Specific examples of negative electrode-active materials include elemental lithium or alloys thereof, Li-Al alloys, calcined carbonaceous materials (see, for instance, J. P. KOKAI No. Sho 58-209864), $TiS_2$, $LiTiS_2$ (U.S. Pat. No. 3,983,476), $WO_2$ (U.S. Pat. No. 4,198,476), spinel compounds such as $Li_x Fe(Fe_2)O_4$ (J. P. KOKAI No. Sho 58-220362), lithium compounds of $Fe_2O_3$ (J. P. KOKAI No. Hei 3-112070), $Nb_2O_5$ (Japanese Examined Patent Publication (hereunder referred to as "J. P. KOKOKU") No. Sho 62-59412 and J. P. KOKAI No. Hei 2-82447), iron oxides (FeO, $Fe_2O_3$, $Fe_3O_4$), cobalt oxides (CoO, $Co_2O_3$, $Co_3O_4$)(J. P. KOKAI No. Hei 3-291862) and Li-containing transition metal oxides. Preferred are Li-containing transition metal oxides represented by the following formula: $Li_{(p)} M_{1 (q)} M_{2 (1-q)} O_{(r)}$ (wherein $M_1$ represents at least one element selected from the group consisting of Co, Ni and Zn; $M_2$ represents at least one element selected from the group consisting of V and Nb; (p), (q), (1-q) and (r) each is a suffix for representing elemental composition of the compound, (p) is 0 to 3; (q) is 0 to 1; (r) is 1.2 to 5.5) and/or calcined carbonaceous materials, with Li-containing transition metal oxides obtained through calcination being more preferred. Most preferred are Li-containing transition metal oxides obtained through calcination, whose basic crystalline structure is altered by chemically incorporating lithium ions.

The depolarizing mix for electrode as conductive agents may in general comprise at least one conductive materials selected from the group consisting of natural graphite (scaly graphite, flaky graphite, clayey graphite), artificial graphite, carbon black, acetylene black, ketchen black, carbon fibers, powder of metals (such as copper, nickel, aluminum, silver (J. P. KOKAI No. Sho 63-148554)), metal fibers and polyphenylene derivatives (J. P. KOKAI No. Sho 59-20971). The amount thereof to be incorporated preferably ranges from 1 to 50% by weight, in particular, 2 to 30% by weight.

The ratio of positive electrode capacity to negative electrode capacity (hereunder referred to as "Ratio C/A" and calculated on the basis of the following formula: Ratio C/A=(weight of positive electrode-active material)/(weight of negative electrode-active material)) preferably ranges from 1 to 6, more preferably 2 to 5 and most preferably 2.5 to 4.

Binder used herein may be, for instance, polysaccharides, thermoplastic resins and polymers having rubber elasticity which may be used alone or in combination. Specific examples of preferred binders are starch, polyvinyl alcohol, carboxymethyl cellulose, hydroxypropyl cellulose, regenerated cellulose, diacetyl cellulose, polyvinyl chloride, polyvinyl pyrrolidone, poly(tetrafluoroethylene), polyvinylidene fluoride, polyethylene, polypropylene, EPDM, sulfonated EPDM, SBR, polybutadiene, fluororubber and polyethylene oxide. The amount of the binder to be incorporated preferably ranges from 0.5 to 50% by weight, in particular, 1 to 15% by weight. Moreover, the depolarizing mix for electrode may likewise comprise a fibrous material of, for instance, a polyolefin such as polypropylene or polyethylene, glass or carbon as a filler.

The depolarizing mix for electrode is prepared using a mortar, a mixer, a homogenizer, a sand mill, a dissolver, a paint shaker, a kneader or Dynomill.

The support for the depolarizing mix may be aluminum, stainless steel, nickel, titanium or alloys thereof for the positive electrode and copper, stainless steel, nickel, titanium or alloys thereof for the negative electrode. The support may have any form such as foils, expanded metals, punching metals or wire gauze.

The depolarizing mix for electrode may be applied to the support by the usual method such as reverse roll coating, direct roll coating, blade coating, knife coating, extrusion coating, slide hopper coating, curtain coating, gravure coating, bar coating, dip coating or squeeze roll coating, with the blade coating, knife coating and extrusion coating being preferably used. The coating is carried out while transporting the support at a velocity of 0.1 m/min to 100 m/min. Good coated surface can be ensured by appropriately selecting the coating method depending on physical properties to be imparted to the depolarizing mix for electrode and the drying ability of a selected particular coating method. In addition, the coating is carried out under a tension ranging from 0.1 kgw/mm$^2$ to 100 kgw/mm$^2$, the magnitude thereof being appropriately selected depending on the yield strength, fluttering and curling of the substrate. More specifically, the magnitude of the tension preferably ranges from 1 to 20 kgw/mm$^2$, in particular, 2.5 to 10 kgw/mm$^2$ for aluminum substrates; and preferably 2 to 50 kgw/mm$^2$, in particular, 2.5 to 25 kgw/mm$^2$ for copper, nickel or stainless steel supports. The thickness, length and width of the coated layer are determined depending on the size of a particular battery, but the thickness of the layer determined after drying and compressing particularly preferably ranges from 1 to 2000μ.

When a solvent remains in the depolarizing mix for electrode, the coated sheet-like electrode is, if necessary, dried to remove the solvent. The drying may be performed by the usual method, in particular, hot-air drying, vacuum drying, infrared drying, far infrared drying, microwave drying, low moisture-air drying and drying through dielectric heating which may be used alone or in combination. The drying temperature preferably ranges from 20° to 350° C. and more preferably 40° to 200° C. The air drying is preferably carried out at a wind velocity of 0.1 to 100 m/sec and more preferably 1 to 30 m/sec. The drying is performed while applying a tension ranging from 0.1 to 100 kgw/mm$^2$, the magnitude thereof being appropriately selected depending on the yield strength, fluttering and curling of the substrate. More specifically, the magnitude of the tension preferably ranges from 1 to 20 kgw/mm$^2$, in particular, 2.5 to 10 kgw/mm$^2$ for aluminum substrates; and preferably 2 to 50 kgw/mm$^2$, in particular, 2.5 to 25 kgw/mm$^2$ for copper, nickel or stainless steel substrates.

The electrode sheet thus prepared is cut into a desired size and/or shape prior to practical use. The width of the negative electrode cut out from the sheet is preferably wider than that of the positive electrode cut out from the sheet preferably by not less than 0.2 mm and not more than 5 mm, more preferably not less than 0.5 mm and not more than 4 mm. The cutting of the electrode sheets may be performed by, for instance, the usual shearing, precision die cutting, burr-free shearing, flash-molding, upper and lower blanking and one-sided burr-die cutting methods or processes. The electrode sheet (positive and/or negative electrodes) is most preferably cut in such a manner that the resulting cut surface is completely free of burr (this is the general name of projections of a material to be cut observed when it is cut), but the cut surface may have burr to some extent. In this respect, the length of the burr in the direction of the thickness of the electrode preferably ranges from 0 to 50% of the electrode thickness and more preferably 5 to 25% thereof. The cutting operation is carried out under a tension ranging from 0.1 kgw/mm$^2$ to 100 kgw/mm$^2$, the magnitude thereof being appropriately selected depending on the yield strength, fluttering and curling of the substrate. More specifically, the magnitude of the tension preferably ranges from 1 to 20 kgw/mm$^2$, in particular, 2.5 to 10 kgw/mm$^2$ for aluminum substrates; and preferably 2 to 50 kgw/mm$^2$, in particular, 2.5 to 25 kgw/mm$^2$ for copper, nickel or stainless steel substrates.

When water remains in the depolarizing mix for electrode, the coated sheet-like electrode is, if necessary, dehydrated to remove the water. The dehydration may be performed by the usual method, in particular, hot-air drying, vacuum drying, infrared drying, far infrared drying, microwave drying, low moisture-air drying and drying through dielectric heating which may be used alone or in combination. The drying temperature preferably ranges from 20° to 350° C. and more preferably 100° to 250° C. The dehydration is preferably carried out while applying a tension ranging from 0.1 to 100 kgw/mm$^2$, the magnitude thereof being appropriately selected depending on the yield strength, fluttering and curling of the substrate. More specifically, the magnitude of the tension preferably ranges from 1 to 20 kgw/mm$^2$, in particular, 2.5 to 10 kgw/mm$^2$ for aluminum substrates; and preferably 2 to 50 kgw/mm$^2$, in particular, 2.5 to 25 kgw/mm$^2$ for copper, nickel or stainless steel substrates. The amount of water remaining in the depolarizing mix for electrode is hereunder referred to as "water content". The water content in the whole battery is preferably not more than 2000 ppm and that in the depolarizing mix for electrode is preferably not more than 500 ppm, more preferably not more than 200 ppm.

The electrode sheet is, if necessary, pressed. The pressing is preferably carried out using calender rolls each having a diameter of from 10 to 100 cm and suitably at a conveying speed ranging from 0.1 to 50 m/min and a pressure ranging from 0.2 to 10 ton/cm$^2$. In addition, the calender rolls are, if desired, heated to a temperature of 20° to 200° C.

The support is, if desired, treated to make the surface thereof uneven to improve the adhesion thereof to the electrode-active material. The surface of the support can be roughened by anodization, electrolysis, sandblasting or rolling by rolls having roughened surfaces, or may also be roughened by the foregoing pressing after application of the active material to the substrate. The surface-roughness of the support is on the order of 0.1 to 10μ.

The negative electrode sheet is, if necessary, charged while it remains in a sheet-like state. The charging is carried out by immersing, in an electrolyte, a negative electrode sheet and lithium or a substance capable of releasing lithium to thus maintain the potential of the negative electrode sheet less than that of lithium or the substance capable of releasing lithium.

The electrode sheet is, if necessary, provided with a lead tub. Examples of materials for such lead tabs are aluminum, nickel, titanium, stainless steel or alloys thereof for the positive electrode sheet; and copper, nickel, titanium, stainless steel or alloys thereof for the negative electrode sheet. Preferred are aluminum for the positive electrode sheet; and nickel and copper for the negative electrode sheet. The lead tabs in general have ribbon-like shapes. Alternatively, it is also possible that one of the tab is provided with a circular portion (the tab is, if necessary, further provided with large and/or small holes or cuts to thus stick out the portion coming in contact with an electrode body) having a diameter approximately identical to that of the electrode body (a wound body obtained by winding positive and negative electrode sheets, through a separator as will be detailed below, into a spiral form) and that the circular portions are fitted to the upper or lower face of the electrode body through, for instance, welding to pick out currents through a plurality of portions. In this case, the edge portion of one electrode-support must be positioned on the upper face while that of the other electrode-support is positioned on the lower face. Moreover, when the edge portion of at least one electrode-support is positioned on the upper or lower face, at least one or optionally a plurality of portions of the edge may be brought into contact with current-collecting means to thus pick out currents.

The lead tab is preferably fitted to the innermost portion when winding the electrode sheets for the positive electrode sheet and to the outermost portion when winding the sheets for the negative electrode sheet. Two or more tabs for each electrode sheet can be fitted to the electrode at proper intervals. The tabs are fitted thereto by direct-current resistance welding, alternating-current resistance welding, pressure welding, laser welding or ultrasonic welding.

An insulating tape is, if necessary, adhered to the lead tabs. Examples of base materials for insulating tape are at least one member selected from the group consisting of aramid fibers, polyimide, flat paper, Capton, ultra-high-molecular-weight polyethylene, Teflon, polyester, hard polyvinyl chloride, polyurethane, vinyl resin, nonwoven fabric, tissue paper, paper, acryl foam, urethane foam, elastomer foam, crepe paper, polyolefin, polypropylene, polyethylene, glass cloth, alumina cloth; and examples of adhesives thereof are at least one member selected from the group consisting of silicone type, acryl type, epoxy type and rubber type ones. Among these, preferred are a tape comprising Capton as the base material and a silicone type adhesive; a tape comprising an aramid fiber as the base material and a silicone type adhesive; and a tape comprising a polyimide as the base material and an acryl type adhesive. The tape may have any shape. When a ribbon-like lead tab is used, tapes having a width slightly greater than that of the ribbon may be adhered to either or both faces of the lead tab or the ribbon may be wrapped up in the tape. The ribbon may be wrapped up in a tape having a width of not less than two times that of the ribbon or it may be wrapped by winding a long and narrow tape around the ribbon in a spiral form.

The separator used herein is an insulating thin film having a high ion-permeability and predetermined mechanical strength. Examples of materials for the separator are olefinic polymers such as polypropylene and polyethylene, glass fibers, polyethylene, alumina fibers, fluoropolymers, cellulosic polymers, polyimide and polyamides. Among these, preferred are polypropylene and polyethylene because of their high resistance to organic solvents and high hydrophobicity, with polypropylene being most preferred. The separator may have a microporous sheet-like, nonwoven fabric-like or woven fabric-like shape, with the microporous sheet-like shape being preferred. The rate of vacancy (defined in ASTM D2873) of the microporous separator is preferably 35 to 40% and more preferably 37 to 39%. The pore size (as determined through observation by an SEM) of the microporous separator preferably ranges from 0.05 to 0.15µ for the major axis (maximum pore size); and 0.01 to 0.07µ for the minor axis (maximum). More preferably, the size ranges from 0.1 to 0.14µ for the major axis (maximum pore size); and 0.03 to 0.06µ for the minor axis (maximum). The separator has a thickness on the order of about 25µ and preferably 20 to 30µ. Moreover, the separator preferably has a resistance to air permeation (determined according to ASTM D-726) ranging from 25 to 60 sec/10 ml, a shrinkage factor (determined according to ASTM D-1204 at 90° C. for 60 min) of less than 5% and a tensile strength (ASTM D-882) of about 1055 kg/cm$^2$ for MD value and about 84 kg/cm$^2$ for TD value. In addition, marked improvement in the effect of the present invention is ensured when using a separator comprising a plurality of the foregoing separators adhered to one another, with a separator comprising two sheets adhered to one another being most preferred. Moreover, the separator is, if desired, subjected to, for instance, a glow discharge treatment, a corona discharge treatment and/or a plasma discharge treatment. Further the separator may, if desired, be provided with a PEO type ion-conductive film. In addition, the separator may, if necessary, comprise a surfactant.

The battery of the present invention may, if necessary, comprise a core. Examples of materials for the core are stainless steel (SUS 304, SUS 301, SUS 316 and SUS 430), aluminum, titanium, nickel, copper, nickel-plated iron, or alloys thereof, glass, alumina, ceramics, clay, plastics, aramid fibers, polyimide, paper, Capton, ultra-high-molecular-weight polyethylene, Teflon, polyester, hard polyvinyl chloride, polyurethane, vinyl resin, acryl foam, urethane foam, elastomer foam, crepe paper and polyolefin such as polypropylene and polyethylene. The core may have a variety of shapes such as a hollow cylinder having an O-shaped cross section, a partially notched hollow cylinder having a C-shaped cross section, a rod-like shape and a porous form. Moreover, the core preferably has a shape whose corners at both edges are rounded or whose diameters at both edges are gradually reduced. The electrode sheets may be wound around the core or the core may be inserted into the wound electrode sheets or may be inserted into the battery after accommodating the electrode body in a battery can.

The winding of the electrodes may be carried out according to the method for winding the electrodes of the known electrolytic capacitor. The winding is carried out by putting, in the order from the outermost sheet for the wound body, an outer separator, an outer electrode, an inner separator and an inner electrode. In this respect, the outer electrode is a negative electrode while the inner electrode is a positive electrode or vice versa. Preferably, the outer electrode is a negative electrode and the inner electrode is a positive electrode when a battery can also serves as a negative electrode-terminal. The outer and inner separators may be continuous at the winding-starting portion or may be independent. Moreover, the outer and inner separators may be continuous at the periphery thereof like an envelope. The winding may be performed by securing the separator to the core and then rotating the core; by inserting the separator in a slit of the core (in this case, the core is a split type one so that the separator can be inserted into the slit) and then rotating the core; or securing the support of the positive or negative electrode to the core and then rotating the core. The separator is preferably in tension by applying an appropriate force thereto. The tension preferably ranges from 50 gw/mm$^2$ to 10 kgw/mm$^2$, more preferably 100 gw/mm$^2$ to 2 kgw/mm$^2$ and most preferably 500 gw/mm$^2$ to 1 kgw/mm$^2$. The tension may be adjusted to a constant level throughout the winding, may be continuously and gradually increased from the initiation to the completion of the winding or may be continuously and gradually reduced from the initiation to the completion of the winding. The winding is carried out at a rotational speed preferably ranging from 20 rpm to 3000 rpm and more preferably 30 to 300 rpm. The rotational speed may be adjusted to a constant level throughout the winding, may be continuously and gradually increased from the initiation to the completion of the winding or may be continuously and gradually reduced from the initiation to the completion of the winding. The resulting wound electrode body may be in the form of cylinder having an approximately circular cross section or an elliptic cylinder having an elliptic cross section.

The web-handling of the separator, electrodes, electrode supports, stopping tape permits detection of tension values through the use of a stepped roll or a tension pick up and appropriate control of the tension values through absorption of fluctuation in the tension and adjustment of winding torque and number of revolutions. Moreover, the aberration of positions in the widthwise direction can be prevented through the use of rollers provided with flanges, a sensor for detecting widthwise positions and rolls for correcting the widthwise aberration of positions. The detection of the widthwise positions may be performed by detecting the widthwise center of the wound body and by detecting the edge thereof. The position-correcting roll may comprise one or two rolls capable of rotating at an angle around the position near the center thereof and the position-correction is carried out by rotating the roll(s) towards the direction along which the aberration can be reduced. Alternatively, the position-correction is carried out by coming, in order, at least two rolls capable of altering their widthwise positions into contact with the web and making a parallel translation of the rolls towards the direction along which the aberration can be reduced upon coming into contact with the web.

A stopping tape is, if necessary, adhered to the wound electrode body. Examples of base materials for the stopping tape are aramid fibers, polyimide, flat paper, Capton, ultrahigh-molecular-weight polyethylene, Teflon, polyester, hard polyvinyl chloride, polyurethane, vinyl resin, nonwoven fabric, tissue paper, paper, acryl foam, urethane foam, elastomer foam, crepe paper, polyolefins such as polypropylene and polyethylene, glass cloth, alumina cloth; and examples of adhesives thereof are silicone type, acryl type, epoxy type and rubber type ones. Among these, preferred are a tape comprising Capton as the base material and a silicone type adhesive; a tape comprising an aramid fiber as the base material and a silicone type adhesive; and a tape comprising a polyimide as the base material and an acryl type adhesive. The stopping tape may be adhered to a part of the outer periphery of the electrode body, to the electrode body over the whole outer periphery, or optionally to the electrode body over the whole outer periphery except for the aforementioned lead tab for the negative electrode. The stopping tape may have a width equal to a fraction of the length of the electrode body or equal to the entire length of the electrode body. Moreover, the electrode body may be wound with 2 to 6 turns of the separator and then the outer periphery thereof can be adhered through heating by a heater or application of ultrasonics. More specifically, a stopping tape (product No. 5413, trade name: Capton Film Tape; available from Sumitomo 3M Ltd.)(base material: Capton (polyimide) H film, 25μ thickness; adhesive: a silicone type one; tape thickness: 70μ) is splitted into a tape having a width of 12 mm, cut into pieces each having a length of 2 to 4 cm and adhered to one (central portion) or two portions (approximately identical intervals) on the electrode body obtained through winding. This stopping method is used in Examples as will be detailed below.

The foregoing electrode body is accommodated in a battery can. Examples of materials for the battery are nickel-plated iron plates, stainless steel (SUS 304, SUS 304L, SUS 304N, SUS 316, SUS 316L, SUS 430 and SUS 444), nickel-plated stainless steel (SUS 304, SUS 304L, SUS 304N, SUS 316, SUS 316L, SUS 430 and SUS 444), aluminum or aluminum alloys, nickel, copper and titanium. The battery can may have a variety of shapes such as a closed-end cylinder, a closed-end elliptic cylinder and a closed-end rectangular cylinder. The thickness of the battery can preferably ranges from 100 to 500μ. The thickness may be reduced to a level on the order of 50 to 150μ for increasing the inner volume thereof. In this case, it is preferred to prevent any deformation due to the internal pressure by forming the bottom thereof into a curved shape or increasing the thickness thereof up to 300 to 500μ. Preferred materials for the can whose thickness is reduced include the foregoing stainless steel, carbon steel and titanium alloys to improve the strength of the can, with superplastic steel being preferred to further reduce the thickness thereof.

Insulating plates are, if desired, arranged between the electrode body and the bottom of the battery can and/or between the electrode body and a battery cap. Examples of materials for such insulating plates are include aramid fibers, polyimide, flat paper, Capton, ultra-high-molecular-weight polyethylene, Teflon, polyester, hard polyvinyl chloride, polyurethane, vinyl resin, nonwoven fabric, tissue paper, paper, acryl foam, urethane foam, elastomer foam, crepe paper, polyolefin such as polypropylene and polyethylene, polyamide, glass cloth and alumina cloth. The insulating plate may, if desired, be porous. In Examples given later, the insulating plate arranged between the bottom of the can and the electrode body used is a disc-like polypropylene insulating plate having a thickness of 270μ and a diameter of 13 mm, and provided with a hole having a diameter of 3 mm at the center thereof, while the insulating plate positioned between the electrode body and the battery cap used is a disc-like polypropylene insulating plate having a thickness of 270μ and a diameter of 13 mm, and provided with a hole having a diameter of 9 mm at the center thereof.

The electrode body may be accommodated in the battery can while the body is still adhered to the stopping tape or after removing the stopping tape or may be accommodated by first inserting the body in a battery can having a radius greater than the desired radius by 50 to 500μ and then narrowing the radius of the can to the desired level at a proper stage after inserting the electrode body in the can. When the electrode body is accommodated in the can while the body is still adhered to the tape, it is preferred that the stopping tape sufficiently covers at least the portion near the tip of the electrode body so that the shape of the tip of the body does not cause deformation. Moreover, if the lead tab is present near the outer periphery of the body, the stopping tape is wound around the body except for the lead tabs and as a result, the cross section of the electrode body becomes an almost true circle. This makes the insertion thereof in the can easy. After inserting the electrode body in the can, the lead tab which is connected to one of the supports of the electrodes is preferably connected, through welding, to the inner bottom face of the battery can. The connection may be carried out by direct-current resistance welding, alternating-current resistance welding, pressure welding, laser welding or ultrasonic welding.

The battery can including, for instance, the electrode body inserted therein preferably has a narrowed diameter near the opening thereof so that the cap and gasket are easily supported (the narrowed portion is called "bead portion" and this operation is called "beading"). The bead portion is formed by pushing a disc-like roller against the side wall of the battery can while rotating the can. In this respect, the battery can is preferably supported by appropriately outwardly pushing the inner wall of the open end thereof against the roller. Alternatively, the bead portion can likewise be formed by pressing the can along the longitudinal direction thereof. The ratio of the outer diameter at the bead portion to that of the can other than the bead portion preferably ranges from 70 to 95%, more preferably 80 to 90% and the bead portion preferably has an approximately circular cross section having a radius of 0.4 to 0.8 mm. Moreover, the diameter of the can near the opening may, in advance, be increased to a size by 5 to 20% greater than the desired value. In this case, the diameter of the portion having a large diameter can be reduced after inserting the electrode body therein to form the bead portion.

A sealing agent can, if desired, be applied to the inner portion near the opening of the can and the gasket. As materials for such sealing agents, preferred are pitches (bituminous substances) such as asphalt and coal tar or mixture thereof. Examples of such mixture include mineral oils, silicone rubber, thermoplastic or thermosetting resins (vinyl acetate resins, or atactic polypropylene), rubber latexes (dispersion or suspension of styrene-butadiene rubber, butadiene rubber, chloroprene rubber, ethylene-propylene rubber or mixture thereof in water together with a cationic surfactant), non-silicone type rubber (natural rubber (NR), isoprene rubber (IR), butadiene rubber (BR), poly(1, 2-butadiene) (1,2-BR), styrene-butadiene rubber (SBR), chloroprene rubber (CR), nitrile rubber (NBR), butyl rubber (IIR), ethylene-propylene rubber (EPM, EPDM), chlorosulfonated polyethylene (CSM) and acryl rubber (ACM, ANM), with non-silicone type rubbers being preferred as the mixture. The mixtures to which clayey minerals such as montmorillonite are added are more preferred. The coated film of the sealing agent is formed by dissolving in or mixing with a non-polar organic solvent, then removing, if necessary, impurities through filtration or sedimentation, then adjusting the viscosity thereof to a proper level, applying the product to desired portions and evaporating the organic solvent. Specific examples of such organic solvents include toluene, xylene, cyclohexane, hexane, chloroform, dichloroethane, dichloromethane or mixture thereof. The sealing agent may likewise be applied to the desired portions after melting through heating. The sealing agent is coated while rotating the can, the gasket or the sealing plate or circularly rotating a nozzle tip through which the sealing agent is injected around the portions to be coated. The number of revolution preferably ranges from 1 to 6000 rpm and more preferably 60 to 600 rpm. When the rotation axis is vertical, the axis is sometimes inclined at an angle ranging from 45° to 30°. The nozzle through 30°. The nozzle through which the sealing agent is injected may be a nozzle provided with a valve, a nozzle having a rectangular cross section, a nozzle having a circular cross section, a nozzle having a fan-shaped cross section, a nozzle whose tip has a curved surface and the portion near the tip is made liquid repellent or a nozzle which is secured in a state inclined at an angle of 45° to 30°. The sealing agent can be fed to a nozzle by pressing the liquid surface of the sealing agent through a pressurized air, spontaneous dropping under the effect of the gravitational force, the use of a squeezing tube, a flange pump, a syringe-type pump, a gear pump, a rotary pump, a Mohno® pump and capillary penetration.

After winding the electrode body or after inserting the wound body in the battery can and connecting, through welding, the lead tab for negative electrode to the bottom of the can, or after beading and then applying the sealing agent, the assembly is, if necessary, inspected for leak current and/or insulating properties. The determination of the leak current is carried out by applying a DC or AC current voltage ranging from 1 to 10 V between, for instance, the lead tab or terminal of the positive electrode and the lead tab or terminal of the negative electrode and detecting the current flowing therethrough up to 1 pA, or 0.1 to 0.001 pA. Such a device may be, for instance, Quasistatic CV Meter Model 595 available from Keesley Company. Moreover, the insulation may be confirmed by applying a direct or alternating current voltage ranging from 100 to 5000 V between the lead tab or terminal of the positive electrode and the lead tab or terminal of the negative electrode and observing whether a spark current is observed or not. The confirmation is carried out using, for instance, Pinhole Tester Model TR-D available from Sanko Electronics, Inc. The leak current is preferably less than 1 pA when a voltage of 10 V is applied and with respect to the insulation, it is preferred that any spark is not observed when a voltage of at least 1000 V is applied.

The term "non-aqueous electrolyte" herein used means a solution comprising at least one aprotic organic solvent selected from the group consisting of, for instance, propylene carbonate, ethylene carbonate, butylene carbonate, diethyl carbonate, δ-butyrolactone, methyl formate, methyl acetate, 1,2-dimethoxyethane, tetrahydrofuran, 2-methyl tetrahydrofuran, dimethylsulfoxide, 1,3-dioxolan, formamide, dimethyl formamide, dioxolan, acetonitrile, nitromethane, phosphoric acid triester (J. P. KOKAI No. Sho 60-23973), trimethoxymethane (J. P. KOKAI No. Sho 61-4170), dioxolan derivatives (J. P. KOKAI Nos. Sho 62-15771, Sho 62-22372 and Sho 62-108474), sulfolane (J. P. KOKAI No. Sho 62-31959), 3-methyl-2-oxazolidinone (J. P. KOKAI No. Sho 62-44961), propion carbonate derivatives (J. P. KOKAI Nos. Sho 62-290069 and Sho 62-290071), tetrahydrofuran derivatives (J. P. KOKAI No. Sho 63-32872), ethyl ether (J. P. KOKAI No. Sho 63-62166) and 1,3-propane sultone (J. P. KOKAI No. Sho 63-102173) and at least one lithium salt soluble in the aprotic organic solvent selected from the group consisting of, for instance, $ClO_4^-$, $BF_4^-$, $PF_6^-$, $CF_3SO_3^-$, $CF_3CO_2^-$, $AsF_6^-$, $SbF_6^-$, $(CF_3SO_2)_2N^-$, $B_{10}Cl_{10}^-$ (J. P. KOKAI No. Sho 57-74974), (1,2-dimethoxyethane)$_2ClO_4^-$ (J. P. KOKAI No. Sho 57-74977), lower aliphatic carboxylic acid salts (J. P. KOKAI No. Sho 60-41773), $AlCl_4^-$, $Cl^-$, $Br^-$, $I^-$ (J. P. KOKAI No. Sho 60-247265), chloroborane compounds (J. P. KOKAI No. Sho 61-165957) and tetraphenyl boric acid salts (J. P. KOKAI No. Sho 61-214376). Among these, preferred are a non-aqueous electrolyte of $LiBF_4$ in a mixture of propylene carbonate and 1,2-dimethoxyethane; a non-aqueous electrolyte of $LiPF_6$ in a mixed solvent of ethylene carbonate and diethyl carbonate; and a non-aqueous electrolyte of $LiPF_6$ in a mixed solvent of ethylene carbonate, butylene carbonate and diethyl carbonate. The water content of the non-aqueous electrolyte is preferably not more than 500 ppm, more preferably not more than 100 ppm and most preferably not more than 20 ppm.

The non-aqueous electrolyte may be injected into the battery by first injecting a half of the amount thereof required; then reducing the pressure or applying a pressure or centrifuging the battery to soak the electrolyte into the contents of the battery; and injecting the remaining electrolyte, or injecting a half of the remaining electrolyte, then reducing the pressure or applying a pressure or centrifuging the battery to soak the electrolyte into the contents of the battery and injecting the remaining electrolyte.

The ratio of the non-aqueous electrolyte to the active materials: (weight of the non-aqueous electrolyte)/[(weight of the positive electrode-active material)+(weight of the negative electrode-active material)] preferably ranges from 0.05 to 10 and more preferably 0.1 to 0.6.

The volume of the gas phase (space free of liquid and solid and filled with air, argon, electrolyte vapor or the like) left within the battery preferably ranges from 0.1 to 30%, more preferably 0.2 to 5% of the inner volume of the battery.

The surface of the gasket may be subjected to, for instance, glow discharge, plasma discharge and/or corona discharge treatments. Alternatively, the gasket may be heat-treated at 50° to 200° C. for 10 minutes to 100 hours prior to practical use.

Examples of materials for the sealing plate and/or cap include stainless steel (SUS 201 (hereunder "SUS" will be omitted for simplicity), 202, 301, 301J1, 302, 302B, 404, 304L, 304N1, 304N, 2304LN, 305, 309S, 310S, 316,316L, 316N, 316LN, 316J1, 316J1L, 317, 317L, 317J1, 321, 347, XM15J1, 329J1, 329J2L, 405, 410L, 429, 430, 430LX, 434, 436L, 444, 447J1, XM27, 403, 410, 410S, 420J1, 420J2, 429J1, 440A and 631), aluminum or alloys thereof (JIS Name: 1N99, 1N90, 1085, 1080, 070, 1060, 1050, 1230, 1N30, 1100, 1200, 1N00, 2011, 2014, 017, 2117, 2018, 2218, 2618, 2219, 2024, 2025, 2N01, 3003, 203, 3004, 3104, 3005, 3105, 4032, 5005, 5052, 5652, 5154, 254, 5056, 5082, 5182, 5083, 5086, 5N01, 5N02, 6101, 6003, 6151, 6061, 6N01, 6063, 7003, 7N01, 7050, 7072 and 7075), titanium or alloys thereof (such as JIS Group 1, 2 and 3, Ti-0.15 pD, Ti-0.3 Mo-0.8 Ni, Ti-5 Ta), nickel or alloys thereof, copper or alloys thereof, monel, inconel, hastelloy and nickel-plated iron.

Safety valves are arranged between the sealing plate and the cap and/or at a part of the battery can. In Examples, a safety valve is formed by closing a valve hole formed through the sealing plate with a valve body obtained by adhering a heat-fusible film of a polyolefin resin to a metal thin plate, then putting, in order, an auxiliary ring and a cap provided with a cutting blade inwardly projected towards the inside of the battery on the valve body and inwardly bending the outer periphery of the sealing plate through plastic deformation thereof.

The battery container serves to isolate the battery elements from the external conditions such as temperature and humidity and to maintain the normal electrochemical reaction of the battery elements and, for instance, corresponds to the foregoing battery can, gasket, sealing plate and cap.

The battery of the present invention may be equipped with safety elements such as PTC elements, thermal cutout, fuses, bimetal and/or current-breaking elements, which are arranged within the battery, on the cap, on the bottom of the can and/or external conductive joint portions.

The battery of the present invention can be sealed by arranging a gasket between a metallic can serving as one terminal and a metallic cap serving as the other terminal or a metallic pin, i.e., putting the metallic can, gasket, cap or pin on top of one another in this order, and then applying a force to the opening of the metallic can (or one of the pins) to thus cause plastic deformation in the direction along which the gasket is pressed (called crimp-sealing or caulk-sealing). In this case, the opening of the metallic can is preferably partially deformed into a circular cross sectional shape (a radius ranging from 0.3 to 1.5 mm, preferably 0.5 to 1 mm). On the other hand, when a bead portion is formed near the opening of the metallic can, the opening of the metallic can may be subjected to plastic deformation while supporting the metallic can by the bead portion and then a force may be applied to the sealed battery along the vertical direction to crush the bead portion to thus reduce the height of the resulting battery.

The diameter of the battery can may, if desired, be reduced after sealing, prior to the sealing or during sealing. More specifically, The diameter of the battery can is initially set at a level larger than that of the finished battery by 50 to 300μ and then reduced to a predetermined level after sealing.

The battery of the present invention may, if necessary, be provided with an insulating plate or an insulating paint layer at the periphery of the cap, after sealing.

The parts constituting the battery of the invention (such as a positive electrode-current collector, a negative electrode-current collector, a lead tab for positive electrode, a lead tab for negative electrode, separators, a core, an insulating plate, a gasket, a battery can, a sealing plate, a cap, a safety valve and safety elements) are, if desired, washed and/or dried prior to practical use. The washing is desirably carried out using, for instance, water, Freon, acetone and alcohol. Moreover, ultrasonics can be applied during the washing. The drying can be performed by blowing hot air of 30° to 100° C. on these parts or reducing the pressure. The drying may likewise be carried out by irradiating the parts with radiant rays such as far infrared rays and microwaves.

The parts constituting the battery (such as a core, an insulating plate, a gasket, a battery can, a sealing plate, a cap and a safety valve) may, if desired, be inspected for, for example, the tolerance in size, the degree of cylindricality, the roundness, the straightness and the degree of parallelization to select good parts and it is desired to use those prepared in such a manner that they have a tolerance in size, a degree of cylindricality, a roundness, a straightness and a degree of parallelization, each falling within a predetermined range. The tolerance in size is preferably not more than 0.1 mm, more preferably not more than 0.03 mm; the degree of cylindricality is preferably not more than 0.1 mm, more preferably not more than 0.03 mm; the roundness is preferably not more than 0.1 mm, more preferably not more than 0.03 mm; the straightness is preferably not more than 0.1 mm, more preferably not more than 0.03 mm; and the degree of parallelization is preferably not more than 0.1 mm, more preferably not more than 0.03 mm.

The battery of the present invention is, if necessary, washed and/or dried after sealing. The washing is desirably carried out using, for instance, water, Freon, acetone and alcohol. Moreover, ultrasonics can be applied during the washing. The drying can be performed by blowing hot air of 30° to 100° C. on the battery or reducing the pressure. The drying may likewise be carried out by irradiating the battery with radiant rays such as far infrared rays and microwaves. Alternatively, the battery can be dried by applying a centrifugal force thereto or blowing a strong wind on the battery to blow off the drops of washing liquid after washing.

The battery of the present invention is, if necessary, subjected to a post-treatment. Examples of such post-treatments include open-circuit voltage determination, internal resistance determination, discharging, charging, heat-treatment performed at 20° to 90° C. for one hour to 30 days, capacity selection, open-circuit voltage selection and internal resistance selection which may be used alone or in combination. Moreover, an AC voltage having a peak value ranging from 10 to 1000 mV and a frequency ranging from 100,000 to 1 Hz may sometimes be applied to the battery for the activation thereof. The discharging or charging of battery may be carried out independently, but it is more effective to simultaneously discharge or charge 10 to 1000 batteries. More specifically, 10 to 1000 batteries are connected in series in the same circuit and discharged or charged at the same current. Alternatively, 10 to 1000 batteries are connected in parallel and discharged or charged at the same voltage.

The battery of the present invention is, if desired, covered with an armoring material. Examples of such armoring materials are heat-shrinkable tubings, adhesive tapes, metal films, paper, cloths, paints and varnishes and plastic cases. At least part of the armoring or the battery package is provided with a portion capable of changing color upon heating so as to make the heat history during usage obvious.

The battery of the present invention is, if desired, packaged in such a manner that one or a plurality of batteries arranged in series or parallel are packaged in a battery pack. Examples of the packages of a plurality of batteries include 2, 3, 4, 5 or 6 batteries arranged in series and 2, 3, 4, 5 or 6 batteries arranged in parallel. Moreover, the battery pack may be provided with a safety element such as a PTC element, a thermal cutout, a fuse and a current-breaking element as well as a safety circuit (a circuit which monitors, for instance, the voltage, temperature and current of each battery or a pack of a plurality of batteries and has an ability of breaking the current at an instance when the breaking is necessary). Moreover, the battery pack may be provided with at least one external terminal selected from, for instance, positive electrode terminals and negative electrode terminals for individual batteries, terminals for detecting the temperatures of individual batteries, a terminal for detecting the temperature of the pack of a plurality of batteries, a terminal for detecting the current of the pack of a plurality of batteries and pressure-detecting terminals for individual batteries, in addition to the positive and negative electrode-terminals for the packed batteries. Alternatively, it is also possible to design the battery package in such a manner that the package generates a signal carrying information to be transmitted to the foregoing external terminals within the battery package and externally receive the signals, instead of providing the external terminal. The signal is preferably an electromagnetic wave and it is preferred to use the positive or negative electrode-terminal for the battery package as a signal-transmission path. In addition, the battery pack may have a built-in voltage conversion circuit (for instance, DC-DC converter). The batteries in a package are connected by firmly securing a lead plate through welding or fixed using a socket so that they can easily be detachable. The order of connection may be fixed or the package may, if desired, be equipped with a switching element so as to change from the arrangement in series to the arrangement in parallel during charging and discharging or vice versa. Moreover, the battery package may be provided with a function for displaying information such as the remaining capacity of batteries, whether the batteries are discharged or not and the frequency in use.

The battery of the present invention is charged independently or a set of batteries in a package can be charged at a time. The charging of a single battery may be carried out at a constant current, for instance, 500 mA and terminated at a constant voltage, e.g., 4.3 V, or the charging may be performed at a constant current till the voltage reaches a predetermined level, followed by gradual reduction of the current for charging while maintaining the constant voltage and termination of the charging at an instance when the current reaches a desired level or after the lapse of a predetermined time. The charging of a set of batteries packed in a package may be carried out at a constant current, for instance, 500 mA and terminated at a constant voltage, e.g., 4.3 V, or the charging may be performed at a constant current till the voltage reaches a predetermined level, followed by gradual reduction of the current for charging while maintaining the constant voltage and termination of the charging at an instance when the current reaches a desired level or after the lapse of a predetermined time. In the latter case, the charging may be controlled depending on the information, about the internal conditions of the battery package, given in the form of signals or output through the terminals.

The battery of the present invention is used in various machinary and tools such as video movies, portable video decks having built-in monitors, movie cameras having built-in monitors, compact cameras, single-lens reflex cameras, disposable cameras, films provided with lenses, notebook type personal computers, notebook type word processor, electronic memorandum books, portable telephones, codeless telephones, electric razors, electromotive tools, electric mixers and automobiles. In these machinary and tools, the battery is used at a required current level, but the discharge thereof may be controlled depending on the information, about the internal conditions of the battery package, given in the form of signals or output through the terminals in such a manner that the discharge thereof is, for instance, terminated if an excess current (e.g., 4 A) flows or the voltage reaches a particular value.

The present invention will hereunder be explained in more detail with reference to the following Examples, but the present invention is not restricted to these specific Examples.

EXAMPLE 1

There were mixed 86.3 parts by weight of $LiCoO_2$ as a positive electrode-active material and 9.1 parts by weight of graphite and 3 parts by weight of acetylene black as conductive agents followed by addition of a solution of ethyl acrylate-ethylene-maleic anhydride copolymer in toluene (having a solid content of 1.6 part by weight) as a binder, kneading the resulting mixture and application of the mixture to both sides of an aluminum foil current collector having a thickness of $20\mu$. The coated current collector was dried, then compression-molded by a roller press and cut into band-like positive electrode sheets. The resulting positive electrode sheet was further cut into pieces each having a width of 53 mm and a length of 380 mm.

There were mixed 85 parts by weight of $LiCoVO_4$ (prepared by calcining lithium carbonate, cobalt carbonate and vanadium pentoxide in air) as a negative electrode-active material and 10 parts by weight of graphite and 2 parts by weight of acetylene black as conductive agents followed by addition of a solution of ethyl acrylate-ethylene-maleic anhydride copolymer in toluene (having a solid content of 3 part by weight) as a binder, kneading the resulting mixture and application of the mixture to both sides of a copper foil current collector having a thickness of $20\mu$. The coated current collector was dried, then compression-molded by a roller press and cut into band-like positive electrode sheets. The resulting positive electrode sheet was further cut into pieces each having a width of 55 mm and a length of 400 mm.

A microporous separator of polypropylene, the foregoing negative electrode sheet, a microporous separator of polypropylene and the foregoing positive electrode sheet were, in this order, put on top of each other followed by winding the assembly in a spiral form and accommodation of the resulting wound body in a closed-end cylindrical battery can serving as a negative electrode terminal, plated with nickel. A 1 mole/l lithium hexafluorophosphate solution (2:2:6 (volume ratio) mixed solvent of ethylene carbonate, butylene carbonate and diethyl carbonate) as a non-aqueous electrolyte was injected into the battery can. A battery cap serving as a positive electrode terminal was caulked to the battery can through the following three kinds of gaskets to give cylindrical batteries as shown in FIG. 1 (Battery 1 to Battery 5). Incidentally, the positive electrode terminal and a negative electrode can were, in advance, connected to the positive electrode sheet and the negative electrode sheet through lead tabs respectively within the battery.

Battery 1: Block copolymer resin having an ethylene copolymerization rate of 3% (modulus in flexure: 17000):

An ethylene-propylene block copolymer resin whose ethylene copolymerization rate was 3% by weight (modulus in flexure: 17000 $kg/cm^2$) was used as the gasket material to give Battery 1.

Battery 2: Block copolymer resin having an ethylene copolymerization rate of 5% (modulus in flexure: 16000):

An ethylene-propylene block copolymer resin whose ethylene copolymerization rate was 5% by weight (modulus in flexure: 16000 $kg/cm^2$) was used as the gasket material to give Battery 2.

Battery 3: Block copolymer resin having an ethylene copolymerization rate of 7% (modulus in flexure: 15000):

An ethylene-propylene block copolymer resin whose ethylene copolymerization rate was 7% by weight (modulus in flexure: 15000 $kg/cm^2$) was used as the gasket material to give Battery 3.

Battery 4: Block copolymer resin having an ethylene copolymerization rate of 10% (modulus in flexure: 14000):

An ethylene-propylene block copolymer resin whose ethylene copolymerization rate was 10% by weight (modulus in flexure: 14000 kg/cm²) was used as the gasket material to give Battery 4.

Battery 5: Block copolymer resin having an ethylene copolymerization rate of 15% (modulus in flexure: 13000):

An ethylene-propylene block copolymer resin whose ethylene copolymerization rate was 15% by weight (modulus in flexure: 13000 kg/cm²) was used as the gasket material to give Battery 5.

Comparative Example 1

The same procedures used in Example 1 were repeated except that the following copolymer resins were used as gasket materials to give batteries (Battery 6 to Battery 9).

Battery 6: Block copolymer resin having an ethylene copolymerization rate of 1.5% (modulus in flexure: 19000):

An ethylene-propylene block copolymer resin whose ethylene copolymerization rate was 1.5% by weight (modulus in flexure: 19000 kg/cm²) was used as the gasket material to give Battery 6.

Battery 7: Block copolymer resin having an ethylene copolymerization rate of 25% (modulus in flexure: 8000):

An ethylene-propylene block copolymer resin whose ethylene copolymerization rate was 25% by weight (modulus in flexure: 8000 kg/cm²) was used as the gasket material to give Battery 7.

Battery 8: Mixed resin having an ethylene-mixing rate of 0.3% (modulus in flexure: 23000):

A polypropylene resin having an ethylene-mixing rate of 0.3% by weight (modulus in flexure: 23000 kg/cm²) was used as the gasket material to give Battery 8.

Battery 9: Random polymer resin having an ethylene copolymerization rate of 2% (modulus in flexure: 12000):

An ethylene-propylene random copolymer resin whose ethylene copolymerization rate was 2% by weight (modulus in flexure: 12000 kg/cm²) was used as the gasket material to give Battery 9.

(Determination of Storability of Batteries 1 to 9 which were not in use)

Batteries 1 to 9 each was held in a thermostatic chamber maintained at 60° C. and a relative humidity of 90% to determine the internal resistance (1000 Hz) thereof during storage. The results thus obtained are summarized in the following Table 1.

TABLE 1

| | Internal Resistance (m Ω) | |
|---|---|---|
| | Immediately After Production | After 30 Days |
| Battery 1 | 47 | 56 |
| Battery 2 | 45 | 57 |
| Battery 3 | 48 | 61 |
| Battery 4 | 46 | 63 |
| Battery 5 | 47 | 65 |
| Battery 6 | 46 | 55 |
| Battery 7 | 45 | 118 |
| Battery 8 | 48 | 55 |
| Battery 9 | 46 | 78 |

(Determination of Capacity-Deterioration of Batteries 1 to 9 which were in use)

Each battery was inspected for the deterioration in capacity, while repeating charging, discharging and storing under the following conditions (the conditions were those for forced test and determined on the assumption that the high capacity battery of the present invention was in use).

Each battery was charged at a current of 600 mA to a voltage of 4.1 V, followed by repeating, 3 times, storage in a bath maintained at −30° C. and a bath maintained at 60° C. (2 hours each, over the overall storage time of 12 hours), then discharging the battery at a current of 600 mA till the voltage reached 1.8 V in an environment maintained at −10° C. (the battery was discharged at a current of 6 A for one second at intervals of one minute during this stage), after completion of the discharge, repeating, 3 times, storage in a bath maintained at −30° C. and a bath maintained at 60° C. (2 hours each, over the overall storage time of 12 hours) and then storage in a bath maintained at 60° C. and a relative humidity of 90% for one day. The foregoing steps were repeated. The results, i.e., the rates of variation in the discharge time thus observed are listed in the following Table 2.

TABLE 2

| | Rates of Variation in Discharge Time (%) | | |
|---|---|---|---|
| | Repetition Time | | |
| | 1 | 20 | 50 |
| Battery 1 | 100 | 93 | 83 |
| Battery 2 | 100 | 93 | 85 |
| Battery 3 | 100 | 95 | 88 |
| Battery 4 | 100 | 94 | 86 |
| Battery 5 | 100 | 92 | 84 |
| Battery 6 | 100 | 90 | 77 |
| Battery 7 | 100 | 84 | 58 |
| Battery 8 | 100 | 85 | 65 |
| Battery 9 | 100 | 87 | 66 |

As will be seen from the data listed in Tables 1 and 2, the batteries produced by the conventional technique are excellent in storage stability when they are not in use, but are deteriorated when they are in use. On the other hand, the batteries of the present invention satisfy both of these requirements.

As has been proved in the foregoing Example, the present invention can provide a non-aqueous battery whose storage stability is improved when it is not in use and which is not deteriorated even when it is in use (discharge, large current-discharge and pulse-discharge are carried out in an atmosphere whose temperature varies).

What is claimed is:

1. A non-aqueous battery which comprises a positive electrode, a negative electrode and a non-aqueous electrolyte as well as a battery can serving as a negative electrode-terminal and a sealing terminal serving as a positive electrode-terminal which are crimp-sealed through a gasket comprising a polyolefin resin, wherein the polyolefin resin comprises a block copolymer of propylene and ethylene having an ethylene copolymerization rate ranging from 2 to 20% by weight and a modulus in flexure ranging from 12000 to 18000 kg/cm².

2. The non-aqueous battery of claim 1 wherein the negative electrode-active material is a member selected from the group consisting of elemental lithium or alloys thereof, Li-Al alloys, calcined carbonaceous materials, $TiS_2$, $WO_2$, spinel compounds, lithium compounds of $Fe_2O_3$, $Nb_2O_5$, FeO, $Fe_2O_3$, $Fe_3O_4$, CoO, $Co_2O_3$, $Co_3O_4$ and Li-containing transition metal oxides.

3. The non-aqueous battery of claim 2 wherein the negative electrode-active material is a member selected from the group consisting of Li-containing transition metal oxides represented by the following formula:

$$\text{Li}_{(p)} \text{M}_1{}_{(q)} \text{M}_2{}_{(1-q)} \text{O}_{(r)}$$

wherein $M_1$ represents at least one element selected from the group consisting of Co, Ni and Zn; $M_2$ represents at least one element selected from the group consisting of V and Nb; (p) is 0 to 3; (q) is 0 to 1; (r) is 1.2 to 5.5, and calcined carbonaceous materials.

4. The non-aqueous battery of claim 3 wherein the negative electrode-active material is selected from Li-containing transition metal oxides obtained through calcination, whose basic crystalline structure is altered by chemically incorporating lithium ions.

5. The non-aqueous battery of claim 1 wherein the ratio of positive electrode capacity to negative electrode capacity calculated on the basis of the following formula: Ratio C/A=(weight of positive electrode-active material)/(weight of negative electrode-active material)), ranges from 1 to 6.

6. The non-aqueous battery of claim 5 wherein the ratio of positive electrode capacity to negative electrode capacity: C/A ranges from 2.5 to 4.

7. The non-aqueous battery of claim 1 wherein the negative electrode comprises a substance capable of absorbing and releasing lithium ions.

8. The non-aqueous battery of claim 1 wherein the width of the negative electrode is wider than that of the positive electrode by not less than 0.2 mm and not more than 5 mm.

9. The non-aqueous battery of claim 8 wherein the width of the positive electrode is wider than that of the negative electrode by not less than 0.5 mm and not more than 4 mm.

10. The non-aqueous battery of claim 1 wherein the positive electrode and the negative electrode are separated by a separator which is a microporous sheet having a pore size as determined through observation under an SEM ranging from 0.05 to 0.15μ for the major axis; and 0.01 to 0.07μ for the minor axis and a thickness ranging from 20μ to 30∞.

11. The non-aqueous battery of claim 10 wherein the separator has a pore size ranging from 0.1 to 0.14μ for the major axis; and 0.03 to 0.06μ for the minor axis.

12. The non-aqueous battery of claim 10 wherein the separator has a resistance to air permeation as determined according to ASTM D-726 ranging from 25 to 60 sec/10 ml, a shrinkage factor as determined according to ASTM D-1204 at 90° C. for 60 min of less than 5% and a tensile strength as determined according to ASTM D-882 of about 1055 kg/cm² for MD value and about 84 kg/cm² for TD value.

13. The non-aqueous battery of claim 1 wherein the propylene-ethylene block copolymer as a material for gaskets has an ethylene copolymerization rate, based on the total weight of ethylene and propylene, ranging from 2 to 20% by weight.

14. The non-aqueous battery of claim 13 wherein the propylene-ethylene block copolymer as a material for gaskets has an ethylene copolymerization rate, based on the total weight of ethylene and propylene, ranging from 4 to 10% by weight.

15. The non-aqueous battery of claim 1 wherein the proypylene-ethylene block copolymer as a material for gaskets has a modulus in flexure as determined according to ASTM D-790 ranging from 13000 to 17000 kg/cm².

16. The non-aqueous battery of claim 15 wherein the proypylene-ethylene block copolymer as a material for gaskets has a modulus in flexure as determined according to ASTM D-790 ranging from 14000 to 16000 kg/cm².

17. The non-aqueous battery of claim 1 wherein the non-aqueous electrolyte is a member selected from the group consisting of solutions each comprising at least one aprotic organic solvent selected from the group consisting of propylene carbonate, ethylene carbonate, butylene carbonate, diethyl carbonate, δ-butyrolactone, methyl formate, methyl acetate, 1,2-dimethoxyethane, tetrahydrofuran, 2-methyl tetrahydrofuran, dimethylsulfoxide, 1,3-dioxolan, formamide, dimethyl formamide, dioxolan, acetonitrile, nitromethane, phosphoric acid triester, trimethoxymethane, dioxolan derivatives, sulfolane, 3-methyl-2-oxazolidinone, propion carbonate derivatives, tetrahydrofuran derivatives, ethyl ether and 1,3-propane sultone and at least one lithium salt soluble in the aprotic organic solvent selected from the group consisting of $ClO_4^-$, $BF_4^-$, $PF_6^-$, $CF_3SO_3^-$, $CF_3CO_2^-$, $AsF_6^-$, $SbF_6^-$, $(CF_3SO_2)_2N^-$, $B_{10}Cl_{10}^-$, $(1,2\text{-dimethoxyethane})_2ClO_4^-$, lower aliphatic carboxylic acid salts, $AlCl_4^-$, $Cl^-$, $Br^-$, $I^-$, chloroborane compounds and tetraphenyl boric acid salts.

18. The non-aqueous battery of claim 17 wherein the non-aqueous electrolyte is a non-aqueous electrolyte of $LiBF_4$ in a mixture of propylene carbonate and 1,2-dimethoxyethane; a non-aqueous electrolyte of $LiPF_6$ in a mixed solvent of ethylene carbonate and diethyl carbonate; or a non-aqueous electrolyte of $LiPF_6$ in a mixed solvent of ethylene carbonate, butylene carbonate and diethyl carbonate.

19. The non-aqueous battery of claim 1 wherein the positive electrode-active material is a member selected from the group consisting of cobalt oxides, Li-Co oxides, Li-Ni-Co oxides, vanadium oxides, Li-V oxides, manganese oxides, Li-Mn oxides, Li-Ni-Mn oxides, polyaniline derivatives, pyrrole derivatives, polythiophene derivatives, polyacene derivatives and poly(p-phenylene) derivatives.

20. The non-aqueous battery of claim 1 wherein said negative electrode comprises a substance capable of absorbing and releasing lithium ion.

* * * * *